US006883619B1

(12) United States Patent
Huang

(10) Patent No.: US 6,883,619 B1
(45) Date of Patent: Apr. 26, 2005

(54) BIDIRECTIONAL PNEUMATIC IMPACT WRENCH

(76) Inventor: Yung-Chao Huang, 20F, No. 29, Sec. 2, Chungcheng E. Rd., Tamshui Chen, Taipei Hsien (TW)

(*) Notice: Subject to any disclaimer, the term of this patent is extended or adjusted under 35 U.S.C. 154(b) by 35 days.

(21) Appl. No.: 10/762,939

(22) Filed: Jan. 22, 2004

(51) Int. Cl.[7] .............................................. B23B 45/04
(52) U.S. Cl. ...................... 173/93.5; 173/168; 173/169
(58) Field of Search ......................... 173/93, 93.5, 168, 173/169, 170, 221, 218

(56) References Cited

U.S. PATENT DOCUMENTS 3,951,217 A * 4/1976 Wallace et al. ............. 173/169
4,109,735 A * 8/1978 Bent .......................... 173/221
4,418,764 A * 12/1983 Mizobe ...................... 173/177
4,462,282 A * 7/1984 Biek ......................... 81/57.11
5,083,619 A * 1/1992 Giardino et al. .............. 173/93
5,346,024 A * 9/1994 Geiger et al. ............... 173/221
6,161,627 A * 12/2000 Seith et al. ................ 173/93.5
6,634,438 B1 * 10/2003 Pusateri et al. ................ 173/1

* cited by examiner

*Primary Examiner*—Scott A. Smith
(74) *Attorney, Agent, or Firm*—Alan D. Kamrath; Nikolai & Mersereau, P.A.

(57) ABSTRACT

A bidirectional pneumatic impact wrench has a pneumatic motor and an air control valve. The pneumatic motor has a forward air inlet and a reverse air inlet. The air control valve directs compressed air selectively into either the forward air inlet or the reverse air inlet to change the direction of rotation of the pneumatic motor and includes a rotatable shaft. The shaft has an exterior surface and a spiral forward air groove and reverse air groove that are symmetrically defined in the exterior surface to direct the compressed air efficiently. The air control valve is simple to fabricate and directs the compressed air efficiently into the pneumatic motor to improve power and efficiency of the pneumatic motor.

10 Claims, 8 Drawing Sheets

BIDIRECTIONAL PNEUMATIC IMPACT WRENCH

BACKGROUND OF THE INVENTION

1. Field of the Invention

The present invention relates to a pneumatic impact wrench, and more particularly to a bidirectional pneumatic impact wrench with a rotatable air control valve that has two spiral air grooves to direct compressed air to control the direction of rotation of a pneumatic motor in the bidirectional pneumatic impact wrench.

2. Description of Related Art

Pneumatic or air-driven impact wrenches are extensively used to rapidly fasten or loosen bolts or nuts. Most pneumatic impact wrenches generally have an air control valve to direct compressed air and control the direction of rotation of a drive shaft of the pneumatic impact wrench to fasten or loose bolts or nuts.

A rotatable air control valve is convenient to use because a person just needs to rotate the air control valve to change the direction of rotation of the drive shaft. A conventional air control valve in a bidirectional pneumatic impact wrench uses a cylindrical shaft with multiple air slots with different diameters. The air slots are equally spaced along the cylindrical shaft. When operating the air control valve, the air slot with a desired diameter selectively makes a desired air slot communicate with a pneumatic motor of the impact wrench. The airflow of the compressed air is directed and regulated by the desired air slot. However, this kind of air control valve cannot directly reverse the rotation of the pneumatic motor and needs a reversing device to make the rotation of the motor reverse. The conventional air control valve has a complicated structure and only makes the pneumatic motor rotate in one direction, which raises manufacturing cost.

The conventional cylindrical shaft of the air control valve uses simply air slots with different diameters, which cannot accurately direct and regulate the airflow of the compressed air to make the pneumatic impact wrench output optimum torque.

To overcome the shortcomings, the present invention provides an improved air control valve cylindrical shaft to mitigate or obviate the aforementioned problems.

SUMMARY OF THE INVENTION

The main objective of the invention is to provide a pneumatic impact wrench that has a rotatable air control that has a simple structure and efficiently directs compressed air to a desired path in the pneumatic impact wrench.

A pneumatic impact wrench in accordance with the present invention includes a pneumatic motor and an air control valve. The pneumatic motor has a forward air inlet and a reverse air inlet. The air control valve selectively directs compressed air to either the forward air inlet or the reverse air inlet to change direction of rotation of the pneumatic motor and includes a rotatable shaft. The shaft has an exterior surface and a spiral forward air groove and reverse air groove that are symmetrically defined in the exterior surface to direct the compressed air efficiently. The air control valve has a simple structure and directs the compressed air into the pneumatic motor efficiently to improve power and efficiency of the pneumatic motor because of the spiral air grooves in the shaft.

Other objectives, advantages and novel features of the invention will become more apparent from the following detailed description when taken in conjunction with the accompanying drawings.

DETAILED DESCRIPTION OF PREFERRED EMBODIMENT

Figure 1:
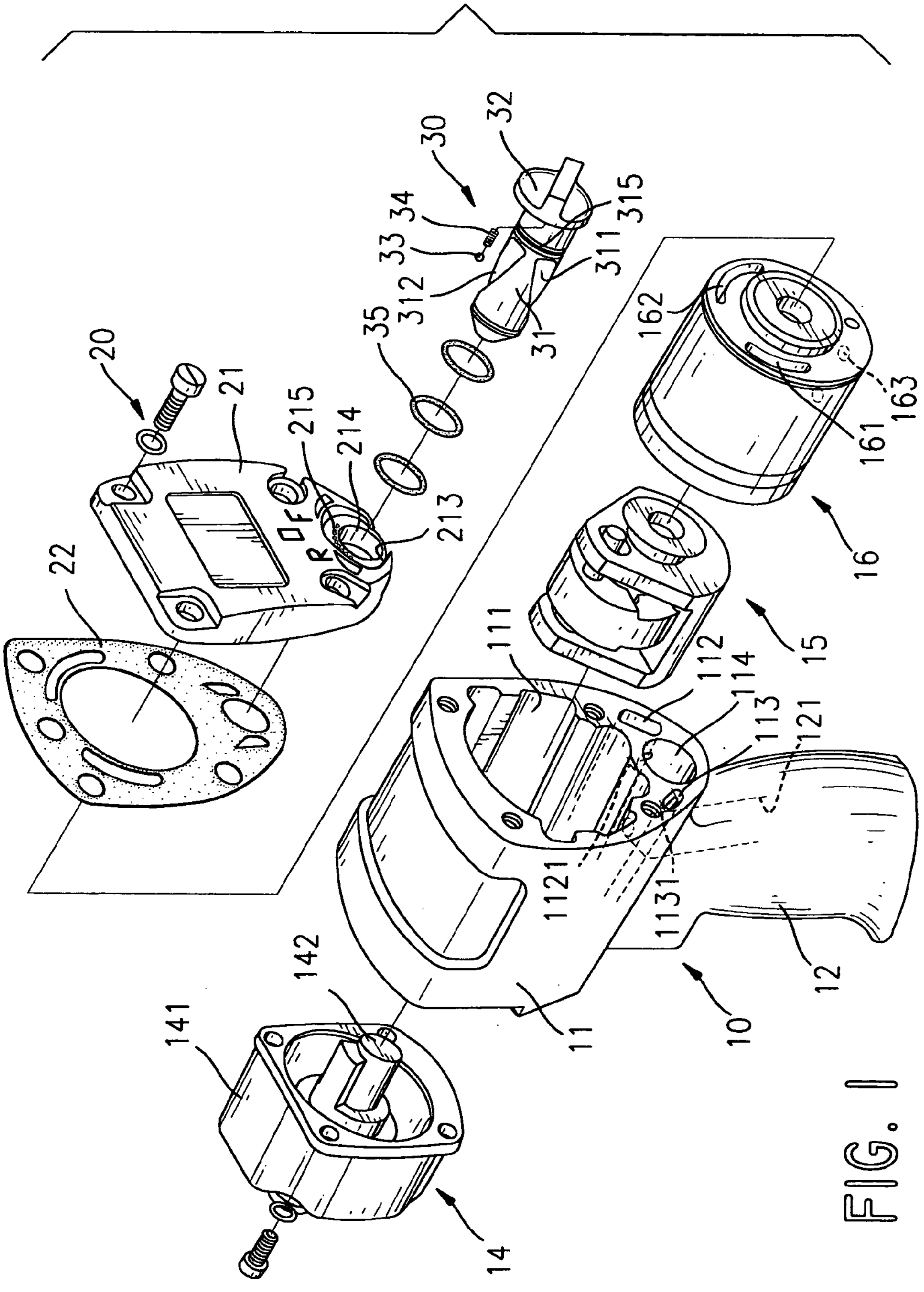
FIG. 1 is an exploded perspective view of a pneumatic impact wrench in accordance with the present invention.

With reference to FIG. 1, a pneumatic impact wrench (not numbered) in accordance with the present invention comprises a housing (10), a front assembly (14), a hammer assembly (15), a pneumatic motor (16), a rear assembly (20) and an air control valve (30).

Figure 6:
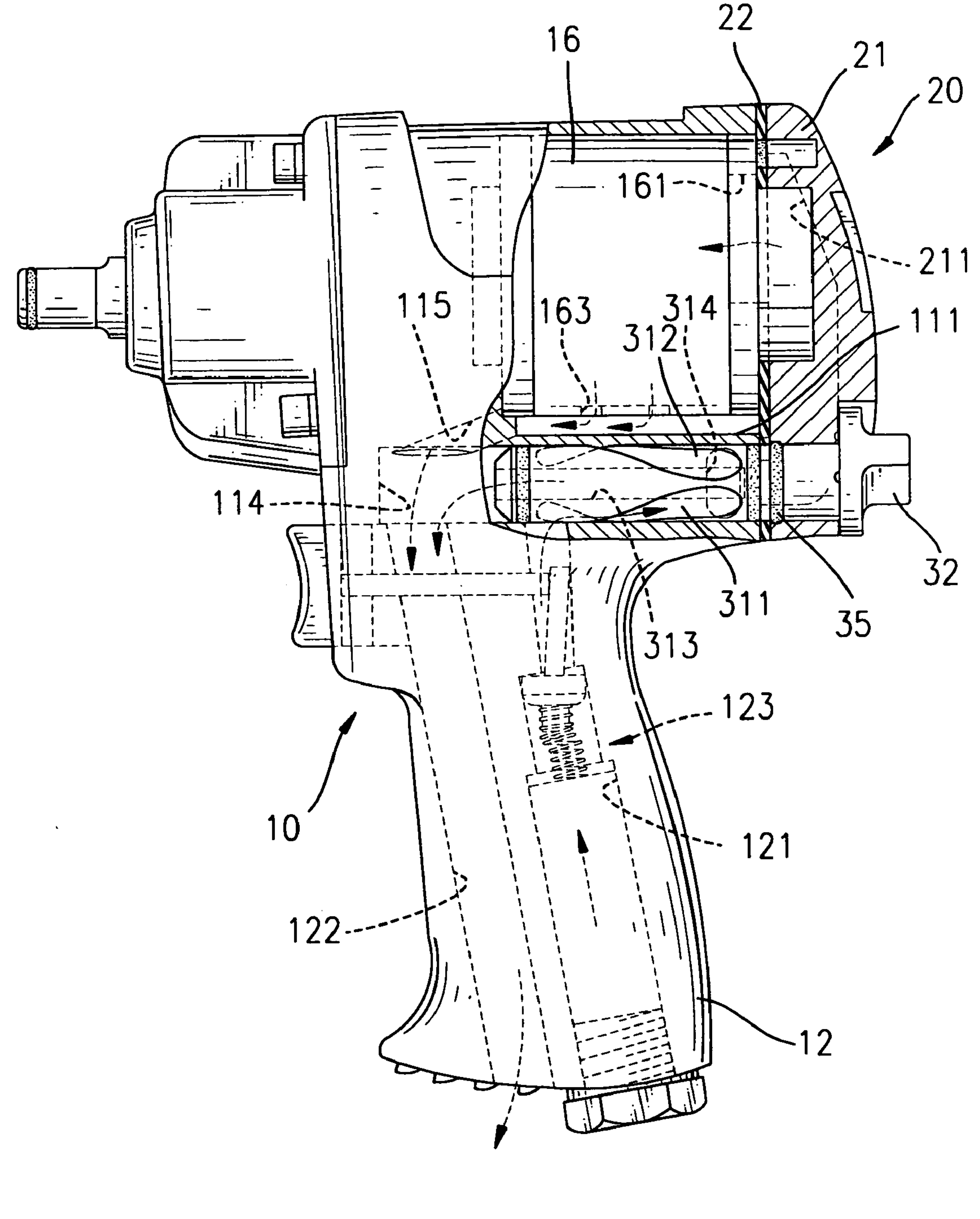
FIG. 6 is an operational side plan view in partial section of the pneumatic impact wrench in FIG. 1 when the pneumatic motor is rotated in a reverse direction.

With further reference to FIG. 6, the housing (10) comprises a motor casing (11) and a handle (12). The motor casing (11) has a front (not numbered), a rear (not numbered), a bottom (not numbered), a motor chamber (111), a forward air passage (112), a reverse air passage (113), a valve chamber (114) and a motor-air discharge port (not numbered). The motor chamber (111) is defined longitudinally completely through the motor casing (11). The valve chamber (114) is defined in the rear of the motor casing (11) under the motor chamber (111). The forward and the reverse air passages (112, 113) are symmetrical and are defined in the motor casing (11) at the rear on opposite sides of the valve chamber (114) below the motor chamber (111). The forward air passage (112) has an inlet (1121) and an outlet (not numbered). The outlet is defined in the rear of the motor casing (111). The inlet (1121) opens to the valve chamber (114). Likewise, the reverse air passage (113) has an inlet (1131) and an outlet (not numbered). The outlet is defined in the rear of the motor casing (111). The inlet (1131) opens to the valve chamber (114). The motor-air discharge port may be implemented with two discharge channels (15). The motor chamber (111) communicates with the valve chamber (114) through the discharge channels (115).

The handle (12) integrally extends from the bottom of the motor casing (11) and has a compressed air passage (121), an exhaust air passage (122) and an air supply valve (123). The compressed air passage (121) and the exhaust air passage (1122) have respectively an inner opening (not numbered) and communicate with the valve chamber (114) through the inner openings. The air supply valve (123) is mounted in the compressed air passage (121) to control compressed air to the valve chamber (114).

The front assembly (14) is attached to the front of the motor casing (11) and comprises a front cover (141) and an anvil shaft (142). The front cover (141) is attached to the front of the motor casing (11) to cover the motor chamber (111). The anvil shaft (142) is mounted rotatably in the front cover (141).

The hammer assembly (15) is mounted in the motor chamber (111), and connects to and drives the anvil shaft (142), and the hammer assembly (15) may have a conventional structure and is not further described.

The pneumatic motor (16) is mounted in the motor chamber (111) and connects to and drives the hammer assembly (15). The pneumatic motor (16) has a rear (not numbered), a reverse air inlet (161), a forward air inlet (162) and an air outlet (163). The forward air inlet (162) is defined in the rear to allow compressed air to enter and rotate the pneumatic motor (16) in a forward direction. Likewise, the reverse air inlet (161) is defined in the rear to allow compressed air to enter and rotate the pneumatic motor (16) in a reverse direction. The air outlet (163) may be two through holes. Therefore, the compressed air will enter only either the forward air inlet (162) or the reverse air inlet (162) and be discharged out of the pneumatic motor (16) through the air outlet (163). Since the pneumatic motor (16) may have a conventional structure, further detailed description is not provided.

Figure 2:
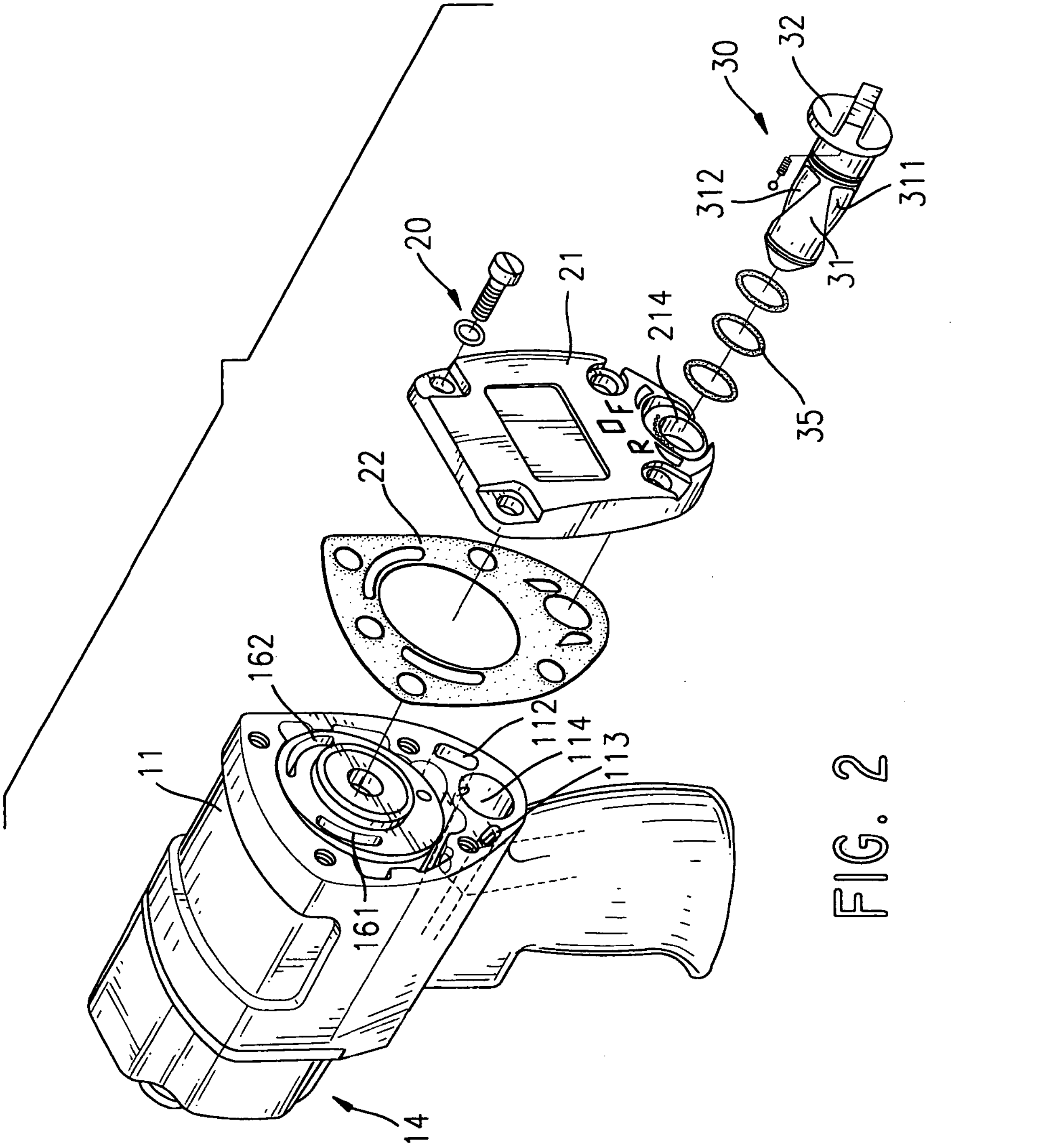
FIG. 2 is a partially exploded perspective view of the pneumatic impact wrench in FIG. 1.
Figure 4:
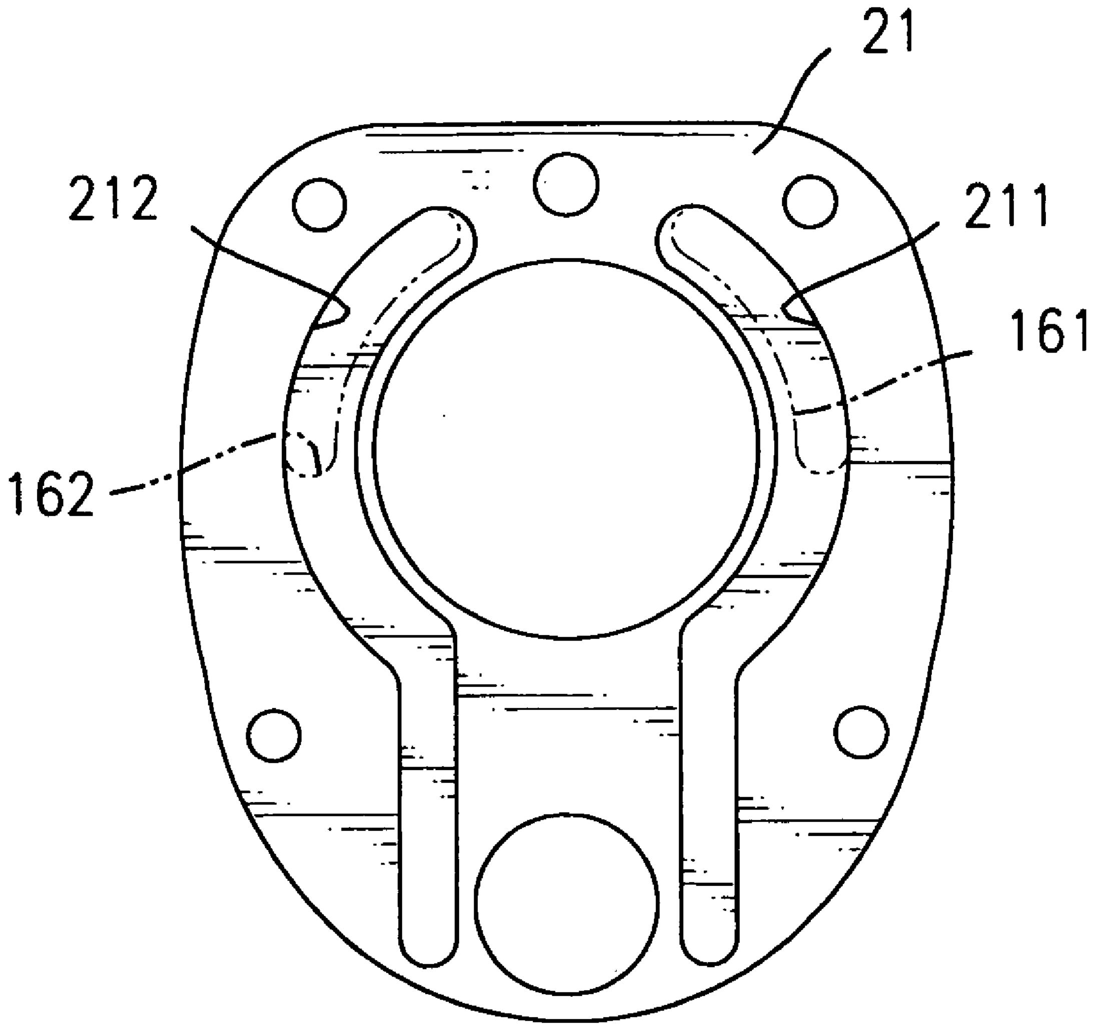
FIG. 4 is a front plan view of a gasket attached to a rear cover of the rear assembly in FIG. 3.

With further reference to FIGS. 2 and 4, the rear assembly (20) is attached to the rear of the motor casing (111) by bolts (not numbered) and comprises a rear cover (21) and a gasket (22). The rear cover (21) is attached to the rear of the motor casing (11) to cover the motor chamber (111) and has an inner side (not numbered), an outer side (not numbered), a reverse air passage (211), a forward air passage (212) and a countersunk hole (213). The forward air passage (212) and the reverse air passage (211) are defined symmetrically in the inner side of the rear cover (21) and have respectively a curved upper segment (not numbered) and a vertical lower segment (not numbered). The curved upper segment of the forward air passage (212) is aligned and communicates with the forward air inlet (162) in the pneumatic motor (16). The upper segment of the reverse air passage (211) is aligned and communicates with the reverse air inlet (161) in the pneumatic motor (16). The countersunk hole (213) is defined in the outer side of the rear cover (21) and is aligned with the valve chamber (114) in the motor casing (111). The countersunk hole (213) has a bottom (not numbered). The bottom of the countersunk hole (213) has a control valve hole (214) and multiple detents (215). The control valve hole (214) is defined through the bottom of the countersunk hole (213), is aligned with the valve chamber (114) in the motor casing (111) and communicates with the valve chamber (114). The detents (215) are defined in the bottom and are arranged in a curved line above the control valve hole (214). The gasket (22) is mounted between the rear of the motor casing (111) and the rear cover (21) to form an airtight seal.

Figure 3:
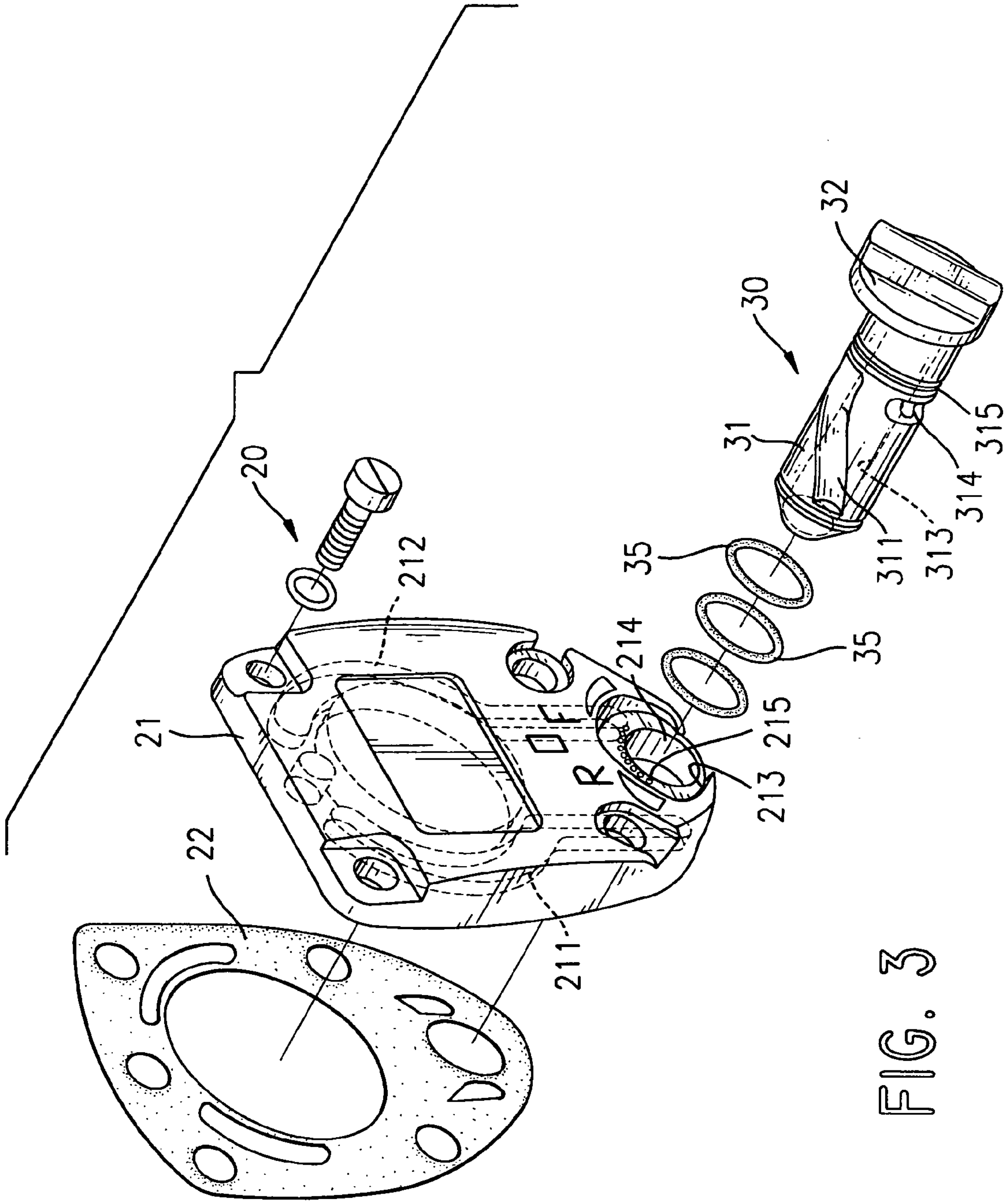
FIG. 3 is an enlarged exploded perspective view of a rear assembly and a valve of the pneumatic impact wrench in FIG. 2.

With further reference to FIG. 3, the air control valve (30) is mounted rotatably at the outer side of the rear cover (21) and comprises a rotatable shaft (31), a knob (32), a positioning device (not numbered) and three O-rings (35). The shaft (31) is rotatable held in the control valve hole (214) and the valve chamber (114) and has an inside end (not numbered), an outside end (not numbered), an exterior surface (not numbered), a reverse air groove (311), a forward air groove (312), an axial hole (313), a tangential slot (314) and three annular slots (315).

The inside end of the shaft (31) is inserted into the control valve hole (214) and extends into the valve chamber (114) so that the shaft (31) is held rotatably in the valve chamber (114). The axial hole (313) is defined in the inside end of the shaft (31). The annular slots (315) are defined around the exterior surface with one adjacent to the inside end and the other two adjacent to the outside end of the shaft (31). The forward and the reverse air grooves (312, 311) are spiral and are defined symmetrically in the exterior surface between the annular slots (315) to direct the compressed air from the compressed air passage (121) to enter selectively into the inlet (1121) of the forward air passage (112) or the inlet (1131) of the reverse air passage (113) in the motor housing (11). The tangential slot (314) is defined in the exterior surface at a position that corresponds to the inlet (1121) of the forward air passage (112) when the reverse air groove (311) is aligned with the inlet (1131) of the reverse air passage (113) and the inlet (1131) of the reverse air passage (113) when the forward air groove (312) is aligned with the inlet (1121) of the forward air passage (112).

Figure 7:
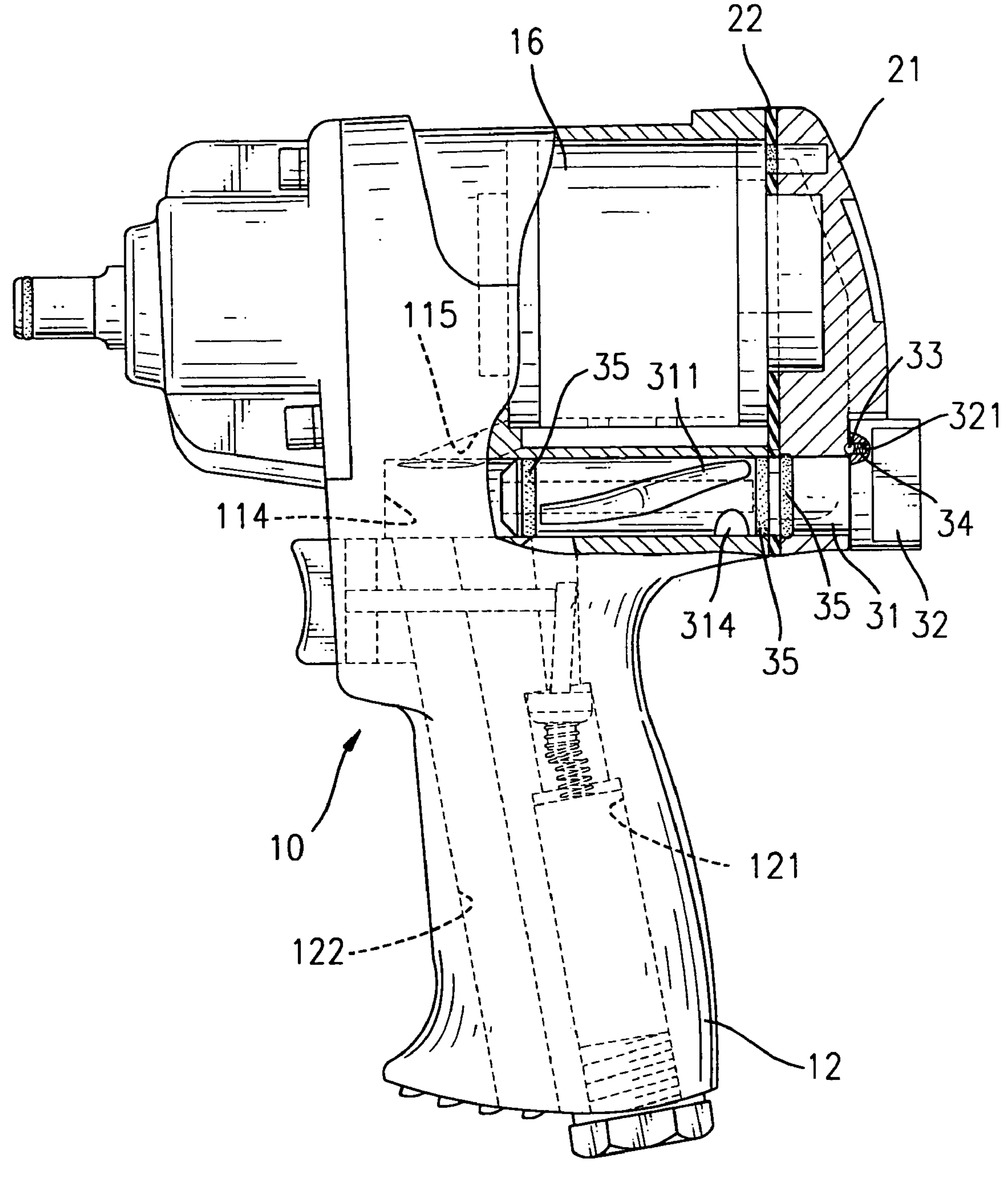
FIG. 7 is an operational side plan view in partial section of the pneumatic impact wrench when the pneumatic motor in FIG. 6 is stopped.

With reference to FIGS. 1 and 7, the knob (32) is eccentrically attached to the outer end of the shaft (31) and has an inner side (not numbered) and a spring hole (321). The inner side of the knob (32) rotatably abuts the bottom of the countersunk hole (213). The spring hole (321) is defined in an eccentric section at the inner side of the knob (32) and selectively corresponds to the detents (215).

The positioning device is mounted between the bottom of the countersunk hole (213) and the inner side of the knob (32) to hold the knob (32) in place and comprises a ball (33) and a resilient element, such as a spring (34). The spring (34) is mounted in the spring hole (321) of the knob (32). The ball (33) is partially held in the spring hole (321), compresses the spring (34) in the spring hole (321) and engages simultaneously one of the detents (215) to keep the knob (32) from rotating.

The O-rings (35) are mounted respectively in the annular slots (315) on the shaft (31). The O-ring (35) adjacent to the inner end of the shaft (31) is positioned between the inner openings of the compressed air passage (121) and the exhaust air passage (122) to keep the compressed air from directly being exhausted through the exhaust air passage (122).

Figure 5:
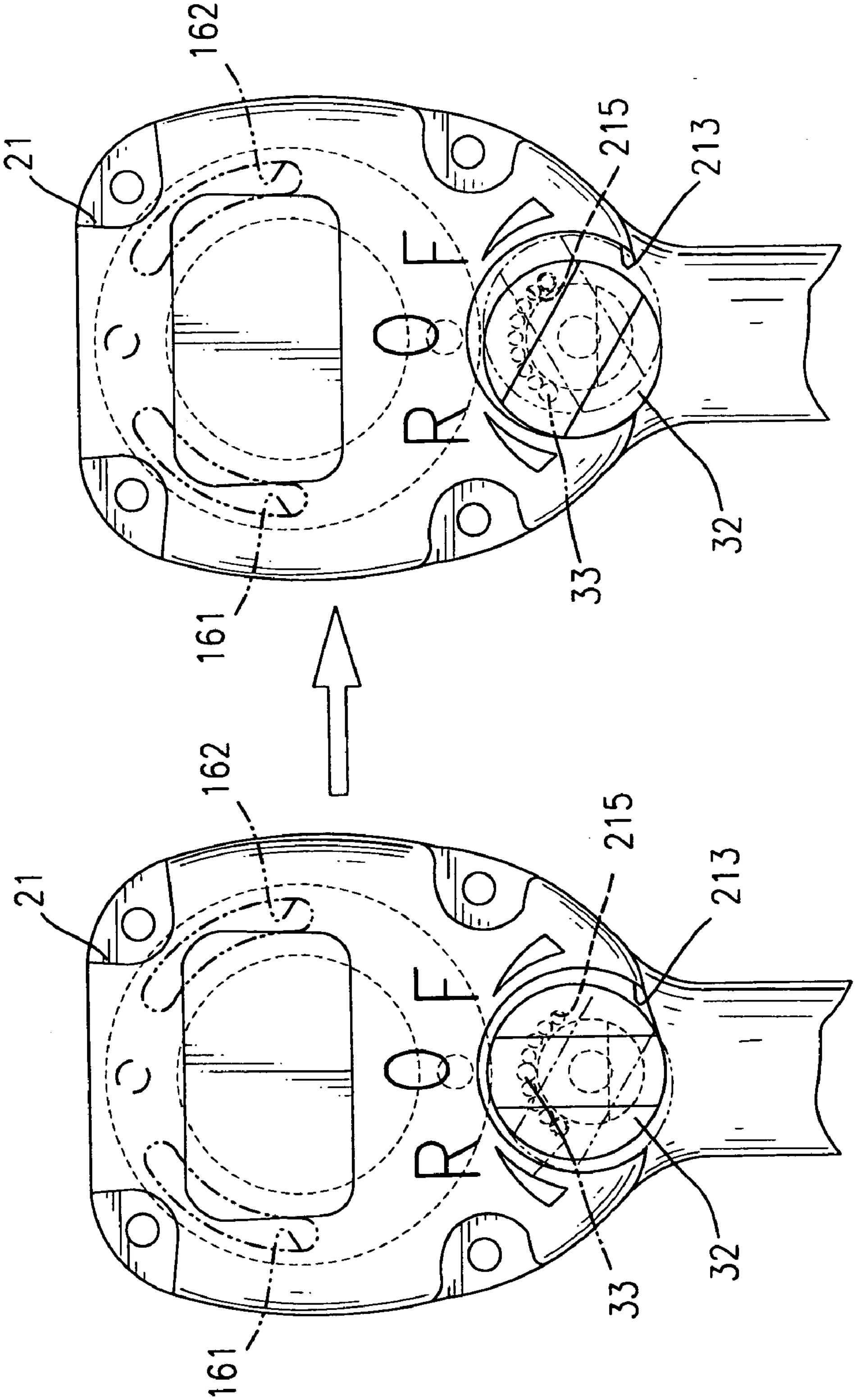
FIG. 5 is an operational rear plan view of the pneumatic impact wrench in FIG. 1.

With reference to FIGS. 3 and 5, a person can turn the knob (32) to rotate the shaft (31) to change angular positions of the reverse air groove (311), the forward air groove (312) and the tangential slot (314). Therefore, either the reverse air groove (311) or the forward air groove (312) is used to direct the compressed air into the pneumatic motor (16).

With reference to FIGS. 3 and 6, the air supply valve (123) is open to allow the compressed air to enter the valve chamber (114) through the inner opening of the compressed air passage (121). The shaft (31) can be turned to reverse the direction of the pneumatic motor (16). For instance, the reverse air groove (311) communicates with the inner opening of the compressed air passage (121) and the inlet (1131) of the reverse air passage (113). The incoming compressed air is directed into the vertical lower segment of the reverse air passage (211) in the rear cover (21) through the outlet of the reverse air passage (113). The compressed air moves upward into the curved upper segment of the reverse air passage (211), which redirects the compressed air into the pneumatic motor through the reverse air inlet (161) to cause the pneumatic motor (16) to reverse rotation. Most of the incoming compressed air in the pneumatic motor (16) is vented through the air outlet (163) and into the motor chamber (111). The compressed air in the motor chamber (111) enters the exhaust air passage (122) through the discharge channels (115) and is eventually vented to the atmosphere. A small amount of the compressed air in the pneumatic motor (16) enters the curved upper segment of the forward air passage (212) in the rear cover (21) through the forward air inlet (162). The compressed air in the forward air passage (212) enters the axial hole (313) in the shaft (31) through the forward air passage (112) and the tangential slot (314) that communicates with the inlet (1121) of the forward air passage (112) in the motor housing (11). The compressed air in the axial hole (313) enters the exhaust air passage (122) through the valve chamber (114) insulated by the O-ring (35) adjacent to the inner end of the shaft (31).

With reference to FIGS. 5 and 7, the ball (33) engages a respective one of the detents (215) to hold the shaft (31) after the knob (32) is released when a person turns the knob (32) to change the direction of rotation of the pneumatic motor (16). As the shaft (31) is turned, the angular positions of the forward and the reverse air grooves (312, 311) are changed, and in one particular position, they do not communicate with the forward and the reverse air passages (112, 113), which stops the compressed air from going to the pneumatic motor (16). The pneumatic motor (16) is stopped.

Figure 8:
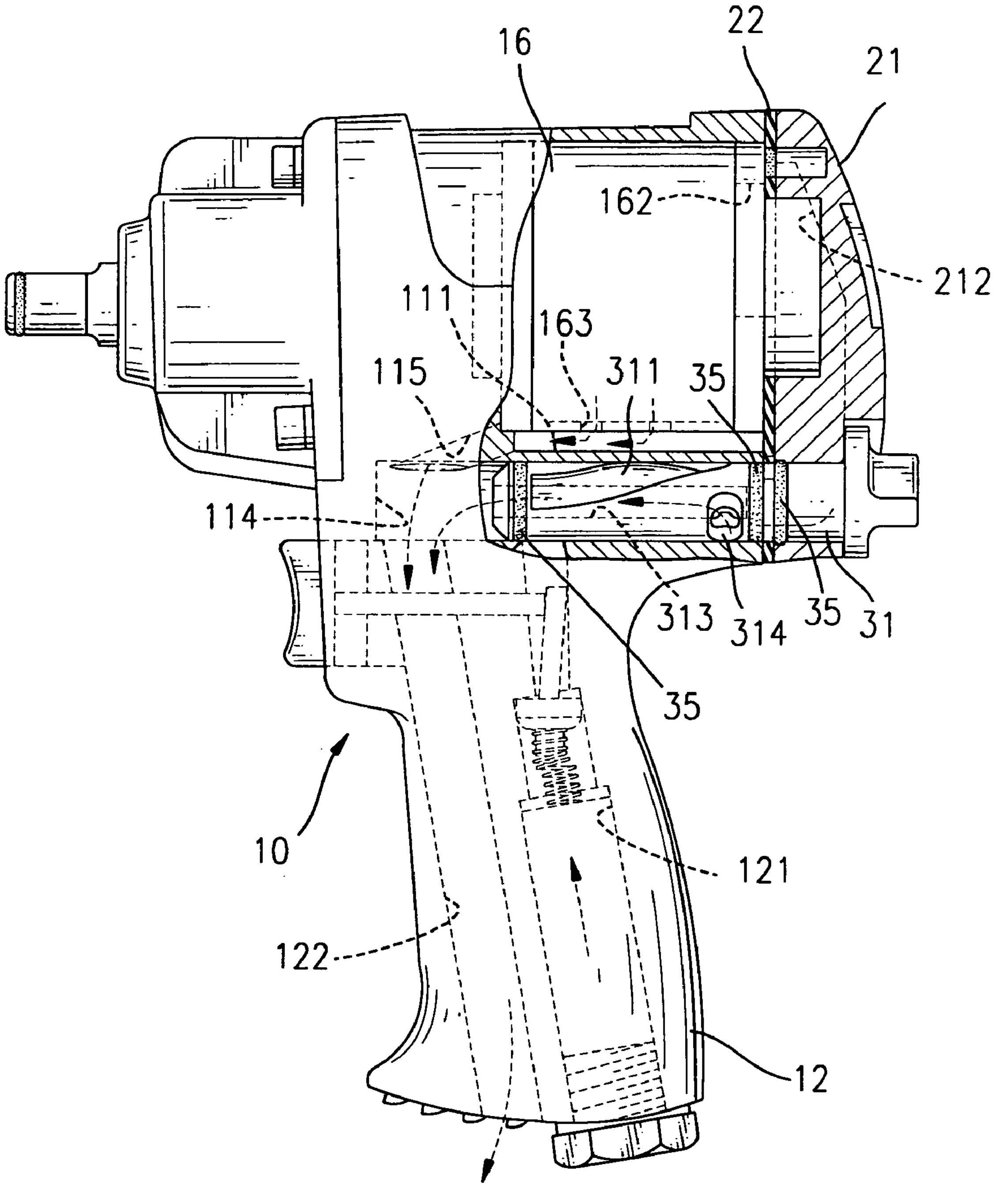
FIG. 8 is an operational side plan view in partial section of the pneumatic impact wrench when the pneumatic motor in FIG. 1 is rotated in a forward direction.

With reference to FIGS. 3, 5 and 8, continuously turning the knob (32) causes the forward and the reverse air grooves (312, 311) and the tangential slot (314) in the shaft (31) to change again, which makes the forward air groove (312) communicate with the inner opening of the compressed air passage (121) through the inlet (1121) of the forward air passage (112). Simultaneously, the tangential slot (314) communicates with the inlet (1131) of the reverse air passage (113) to the axial hole (313).

Consequently, the air control valve (30) has a simple structure that can be simply fabricated and assembled to save manufacturing coats. The shaft (31) of the air control valve (30) has a positioning device that uses a ball (33) and spring (34) combination to precisely hold the knob (32) in place to keep the shaft (31) from unexpectedly rotating. Therefore, the forward and the reverse air grooves (312, 311) can precisely direct the compressed air into the forward and the reverse air inlets (162, 161) to enhance the motor power and improve the motor efficiency.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A bidirectional pneumatic impact wrench comprising:

a housing comprising a motor casing having a front, a rear, a bottom, a motor chamber defined longitudinally through the motor casing, a forward air passage and reverse air passage symmetrically defined in the motor casing at the rear, a valve chamber defined in the rear under the motor chamber and a motor-air discharge port communicating between the motor chamber and the valve chamber; and a handle integrally extending from the bottom of the motor casing and having a compressed air passage with an inner opening communicating with the valve chamber, an exhaust air passage with an inner opening communicating with the valve chamber and an air supply valve mounted in the compressed air passage to control compressed air to the valve chamber;

a front assembly attached to the front of the motor casing;

a hammer assembly mounted in the motor chamber and connected to the front assembly;

a pneumatic motor mounted in the motor chamber, connected to the hammer assembly to drive the hammer assembly and having a rear, a reverse air inlet and forward air inlet defined in the rear and an air outlet communicating with the motor chamber;

a rear assembly attached to the rear of the motor casing and comprising a rear cover attached to the rear of the motor casing to cover the motor chamber and having an inner side, an outer side, a forward air passage and reverse air passage symmetrically defined in the inner side of the rear cover and a control valve hole defined through the outer side of the rear cover and aligned with the valve chamber in the motor casing, where the forward air passage in the rear cover communicates with the forward air passage in the motor housing to the forward air inlet of the pneumatic motor, and the reverse air passage in the rear cover communicates with the reverse air passage in the motor housing to the reverse air inlet of the pneumatic motor; and a gasket mounted between the rear of the motor casing and the rear cover; and an air control valve mounted at the outer side of the rear cover and comprising a rotatable shaft rotatably held in the control valve hole and the valve chamber and having an inside end inserted into the control valve hole and extending into the valve chamber, an outside end, an exterior surface, a spiral forward air groove and reverse air groove symmetrically defined in the exterior surface to direct the compressed air coming from the inner opening of the compressed air passage to selectively enter the forward air passage and the reverse air passage and an annular slot defined in the exterior surface adjacent to the inside end between the openings of the compressed air passage and the exhaust air passage;

a knob attached to the outside end of the shaft to turn the shaft;

a positioning device mounted in the knob to hold the knob in place; and an O-ring mounted in the annular slot to keep the compressed air from directly being exhausted through the exhaust air passage.

2. The bidirectional pneumatic impact wrench as claimed in claim 1, wherein the forward air passage in the motor housing has an outlet defined in the rear of the motor casing and communicating with the forward air passage in the rear cover, and an inlet communicating with the valve chamber; and the reverse air passage in the motor casing has an outlet defined in the rear of the motor casing and communicating with the reverse air passage in the rear cover, and an inlet communicating with the valve chamber.

3. The bidirectional pneumatic impact wrench as claimed in claim 2, wherein the shaft further comprises an axial hole defined in the inside end of the shaft and communicating with the valve chamber, and a tangential slot defined in the exterior surface at a position that corresponds to the inlet of the forward air passage in the motor housing when the reverse air groove is aligned with the inlet of the reverse air passage in the motor housing and the inlet of the reverse air passage in the motor housing when the forward air groove is aligned with the inlet of the forward air passage in the motor housing.

4. The bidirectional pneumatic impact wrench as claimed in claim 3, wherein the rear cover further has a countersunk hole defined in the outer side of the rear cover, aligned with the valve chamber in the motor casing and having a bottom with multiple detents, where the control valve hole is defined through the bottom of the countersunk hole and the detents are arranged in a curved line above the control valve hole;

the knob has an inner side rotatably abutting the bottom of the countersunk hole and a spring hole defined in the inner side of the knob and selectively aligned with the detents; and the positioning device is mounted in the spring hole and comprises a spring mounted in the spring hole and a ball partially held in the spring hole against the spring and engaging one of the detents.

5. The bidirectional pneumatic impact wrench as claimed in claim 4, wherein the shaft further has two annular slots defined in the exterior surface adjacent to the outside end of the shaft to receive respectively two O-rings.

6. The bidirectional pneumatic impact wrench as claimed in claim 5, wherein the forward air passage in the rear cover has a curved upper segment aligned and communicating with the forward air inlet in the pneumatic motor and a vertical lower segment communicating with the outlet of the forward air passage in the motor housing; and the reverse air passage in the rear cover has a curved upper segment aligned and communicating with the reverse air inlet in the pneumatic motor and a vertical lower segment communicating with the outlet of the reverse air passage in the motor housing.

7. The bidirectional pneumatic impact wrench as claimed in claim 6, wherein the air outlet in the pneumatic motor comprises two through holes.

8. The bidirectional pneumatic impact wrench as claimed in claim 7, wherein the knob is eccentrically attached to the outside end of the shaft to form an eccentric section where the spring hole is defined in the eccentric section.

9. The bidirectional pneumatic impact wrench as claimed in claim 1, wherein the rear cover further has a countersunk hole defined in the outer side of the rear cover, aligned with the valve chamber in the motor casing and having a bottom with multiple detents, where the control valve hole is defined through the bottom of the countersunk hole and the detents are arranged in a curved line above the control valve hole;

the knob has an inner side rotatably abutting the bottom of the countersunk hole and a spring hole defined in the inner side of the knob and selectively aligned with the detents; and the positioning device is mounted in the spring hole and comprises a spring mounted in the spring hole and a ball partially held in the spring hole against the spring and engaging one of the detents.

10. The bidirectional pneumatic impact wrench as claimed in claim 1, wherein the air outlet in the pneumatic motor comprises two through holes.

* * * * *